J. J. NOONAN.
CLOTH MEASURING MACHINE.
APPLICATION FILED FEB. 26, 1918.
1,298,250.
Patented Mar. 25, 1919.
5 SHEETS—SHEET 1.
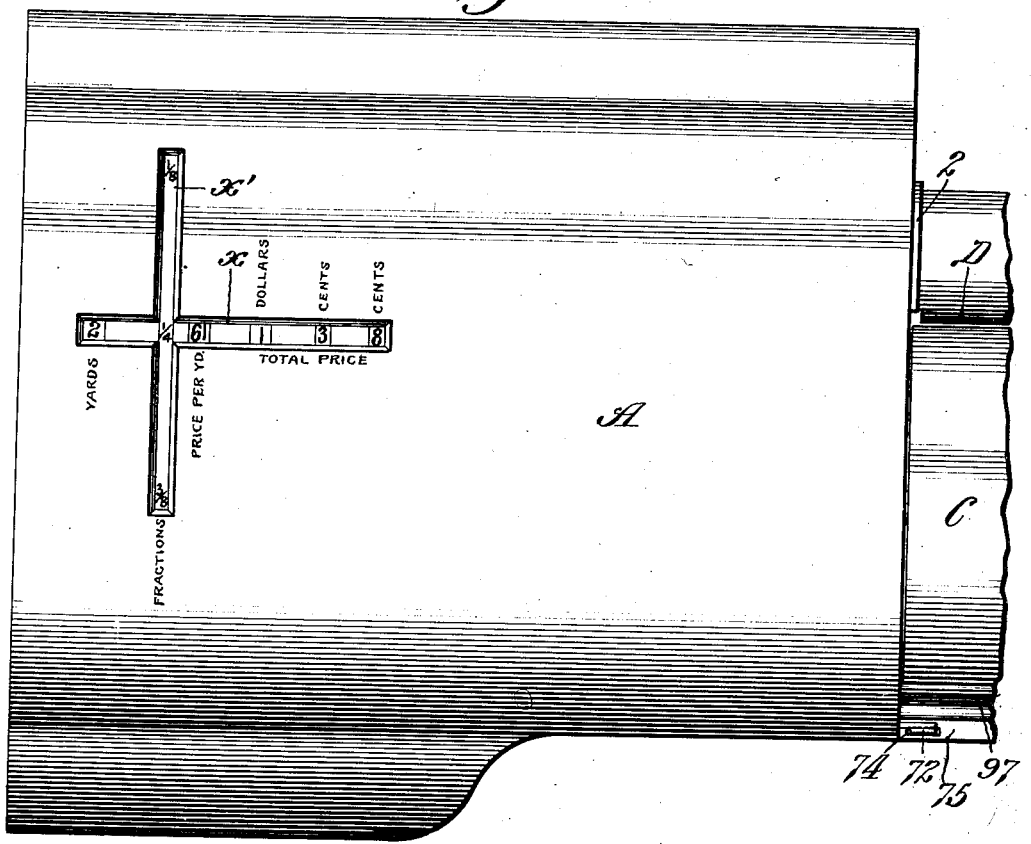
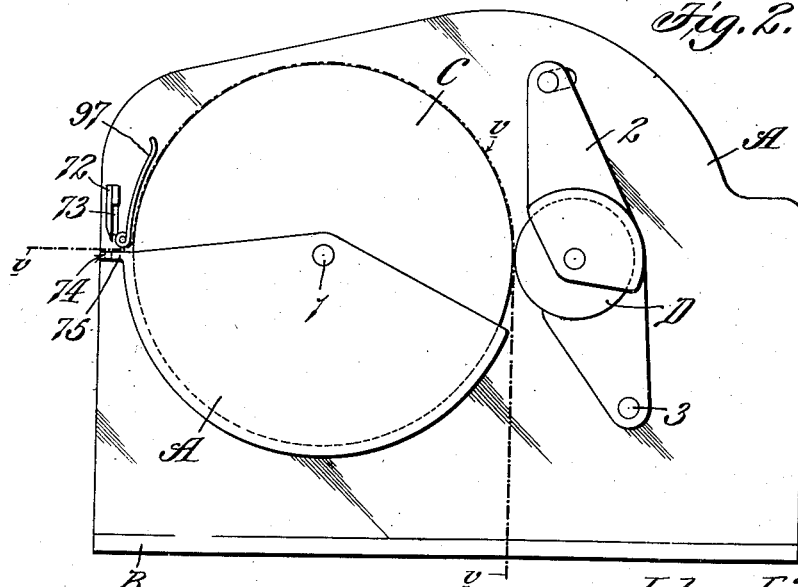
Inventor,
John J. Noonan.
By Bakewell Church Attys.

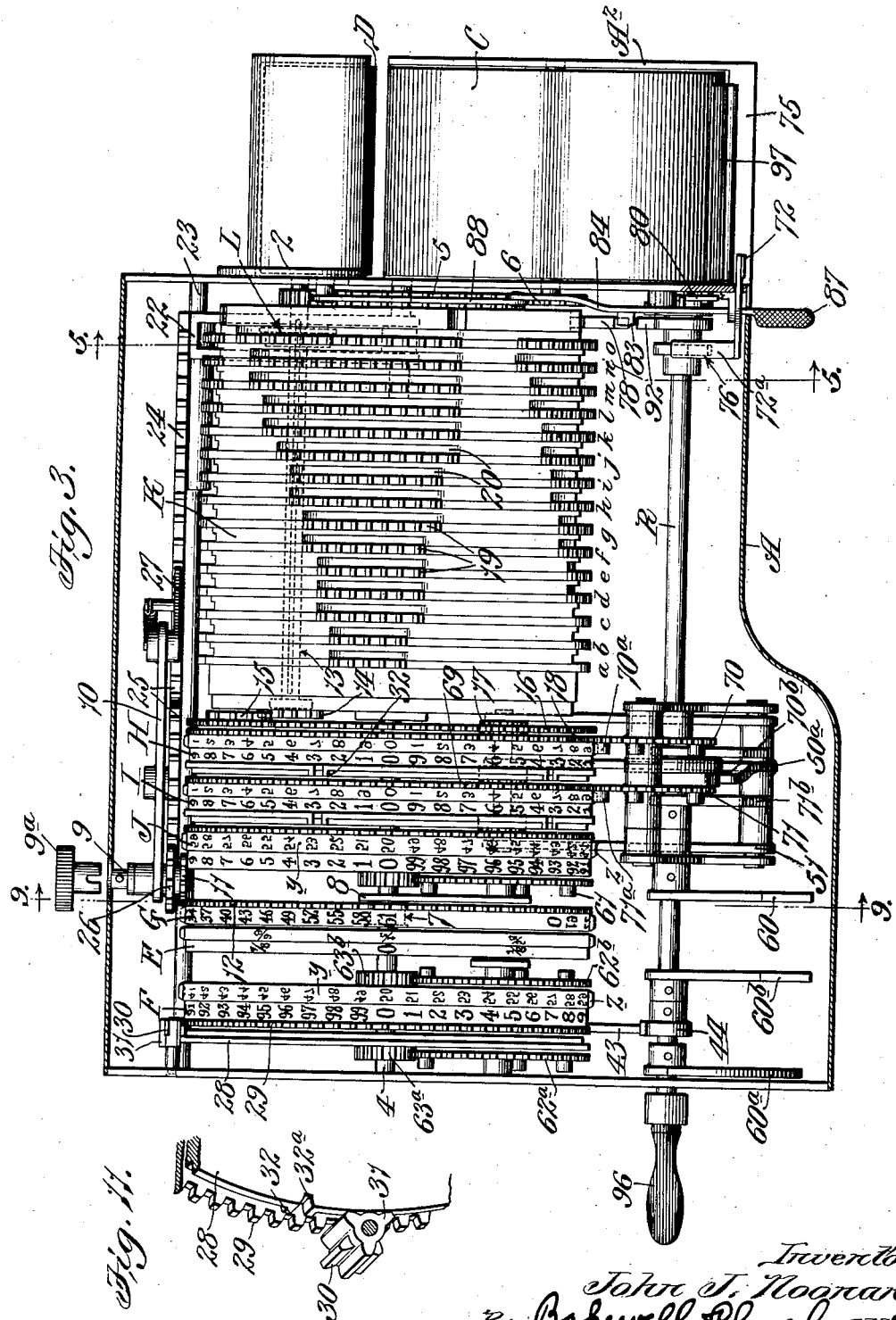

J. J. NOONAN.
CLOTH MEASURING MACHINE.
APPLICATION FILED FEB. 26, 1918.
1,298,250.
Patented Mar. 25, 1919.
5 SHEETS—SHEET 3.
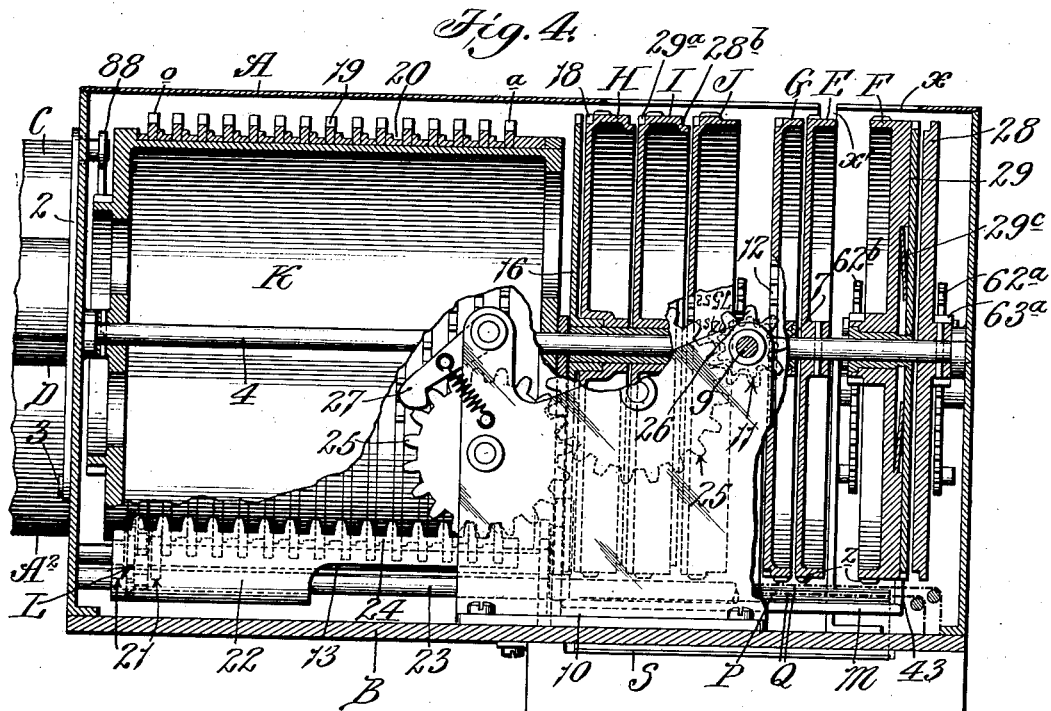
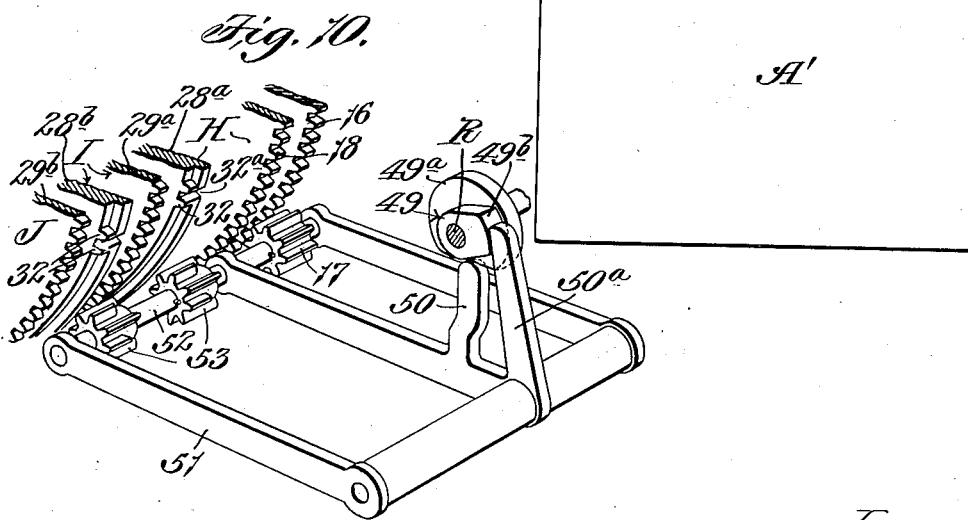
Inventor,
John J. Noonan.
By Bakewell Church Attys J. J. NOONAN.
CLOTH MEASURING MACHINE.
APPLICATION FILED FEB. 26, 1918.
1,298,250.
Patented Mar. 25, 1919.
5 SHEETS—SHEET 4.
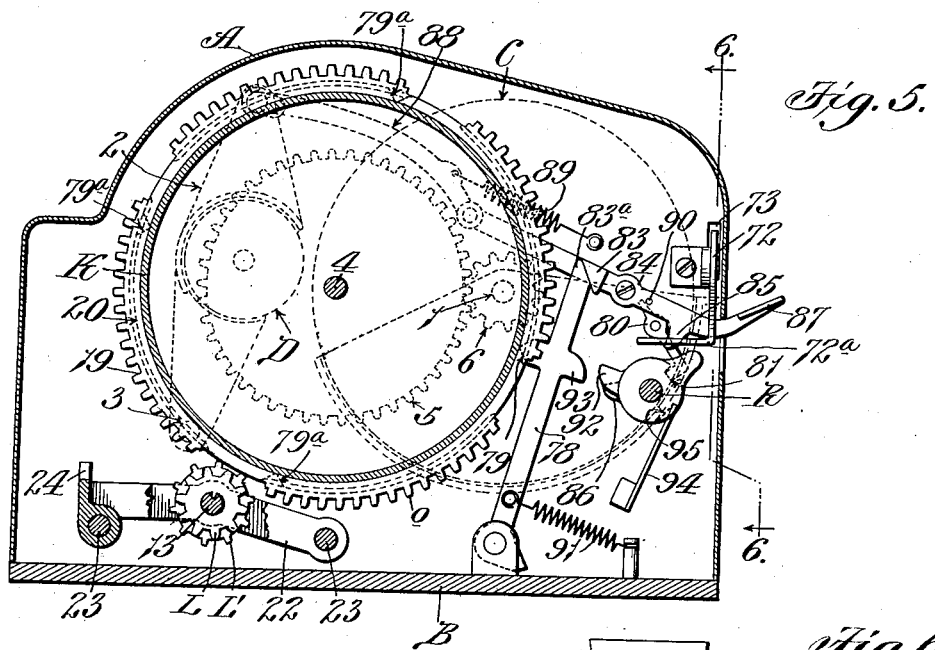
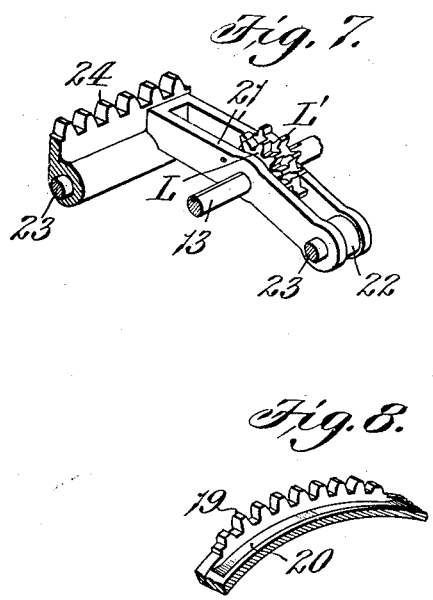
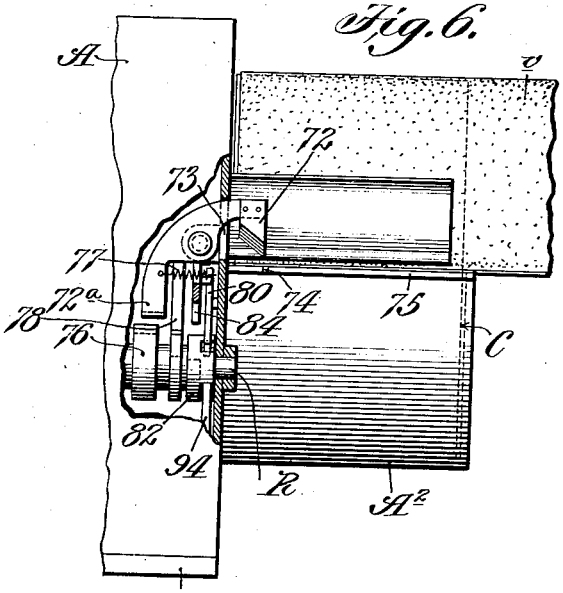
Inventor,
John J. Noonan.
By Bakewell Kluwel Attys.

J. J. NOONAN.
CLOTH MEASURING MACHINE.
APPLICATION FILED FEB. 26, 1918.

1,298,250.

Patented Mar. 25, 1919.
5 SHEETS—SHEET 5.

Inventor,
John J. Noonan.
By Bakewell & Church, Attys.

UNITED STATES PATENT OFFICE.

JOHN J. NOONAN, OF ST. LOUIS, MISSOURI.

CLOTH-MEASURING MACHINE.

1,298,250.     Specification of Letters Patent.     Patented Mar. 25, 1919.

Application filed February 26, 1918. Serial No. 219,193.

*To all whom it may concern:*

Be it known that I, JOHN J. NOONAN, a citizen of the United States, residing at St. Louis, Missouri, have invented a certain new and useful Improvement in Cloth-Measuring Machines, of which the following is a full, clear, and exact description, such as will enable others skilled in the art to which it appertains to make and use the same.

This invention relates to cloth measuring machines of the type that comprise means for computing the sale price of the length of cloth measured by the machine.

One object of my invention is to provide a cloth measuring machine of the general type referred to which is so constructed that there is no liability of the operator making an error in reading the numbers that designate the quantity of cloth measured by the machine and the sale price of said cloth.

Another object is to provide a cloth measuring machine which is so constructed that without changing the adjustment of same it can be used either for measuring cloth as it is sold from the bolt, or for invoicing the cloth the retailer has on hand.

Another object is to provide a cloth measuring machine which is equipped with means for printing and issuing to the customer a sale slip or ticket showing the sale price and quantity of cloth purchased by the customer.

Another object is to provide a cloth measuring machine which is so constructed that a permanent record will be made of each sale for which the machine is used, said record preferably comprising indicia that shows the quantity of cloth purchased by the customer, the price paid for same and the price per yard of the cloth.

Another object is to provide a cloth measuring and sale price computing machine which can be changed easily to adapt it to various scales of prices.

Another object is to provide a novel mechanism for clearing a computing machine or restoring the computing apparatus of such a machine to its starting position.

And still another object is to provide an efficient cloth measuring machine of simple construction that comprises fewer parts and which can be manufactured at a lower cost than the cloth measuring machines now in general use.

To this end I have devised a cloth measuring machine that comprises a pair of rolls between which the cloth to be measured is drawn, a quantity indicator operated by one of said rolls and constructed in such a manner that it will display through a sight opening numerals which represent the quantity or length and the price of cloth measured by the machine, a sale price computing mechanism operated by one of said rolls and constructed in such a manner that it will display through an adjacent sight opening numerals which represent the sale price of the piece of cloth measured, and a price per yard indicator which is adapted to be moved by the operator into such a position that a number or numeral thereon which represents the price per yard of the cloth being measured is displayed to view through the sight opening, the means that governs the position of the price per yard indicator being combined with the sale price computing mechanism in such a manner that the condition of said mechanism is changed automatically whenever the position of said indicator is changed. In the machine herein shown which represents the preferred form of my invention, means is provided for making a permanent record of each transaction or sale for which the machine is used and also for producing a sale slip or ticket which the operator hands to the customer. Various means can be used for this purpose, but I prefer to equip the quantity indicator, the price per yard indicator and the computing mechanism with printing numerals arranged in such a manner that they will produce an impression on a record strip and on a sale check or sale check strip whenever the operator actuates the means that clears the machine or restores the parts of the machine to starting position. Any suitable means can be used for marking the cloth at the completion of the measuring operation, so as to show the operator where to cut the cloth, but I prefer to use a cutting device which forms a slit in the edge of the cloth when the operator clears the machine.

Figure 1 of the drawings is a top plan view of a cloth measuring machine constructed in accordance with my invention.

Fig. 2 is an end elevational view thereof.

Fig. 3 is a top plan view of the machine, the housing or casing being shown in section.

Fig. 4 is a side elevational view, partly in vertical section.

Fig. 5 is a transverse sectional view, taken on the line 5—5 of Fig. 3.

Fig. 6 is a fragmentary elevational view, partly in section on the line 6—6 of Fig. 5.

Fig. 7 is a detail perspective view of the sliding gear and its carriage which form part of the computing mechanism.

Fig. 8 is a detail perspective view of a portion of one of the sectional gears with which the sliding gear coöperates.

Fig. 10 is a detail perspective view of a portion of the computing or accumulating mechanism; and Fig. 11 is a detail perspective view of the carrying or transfer mechanism by which a step by step movement is imparted to the quantity indicator as the cloth is being measured.

Figure 9:
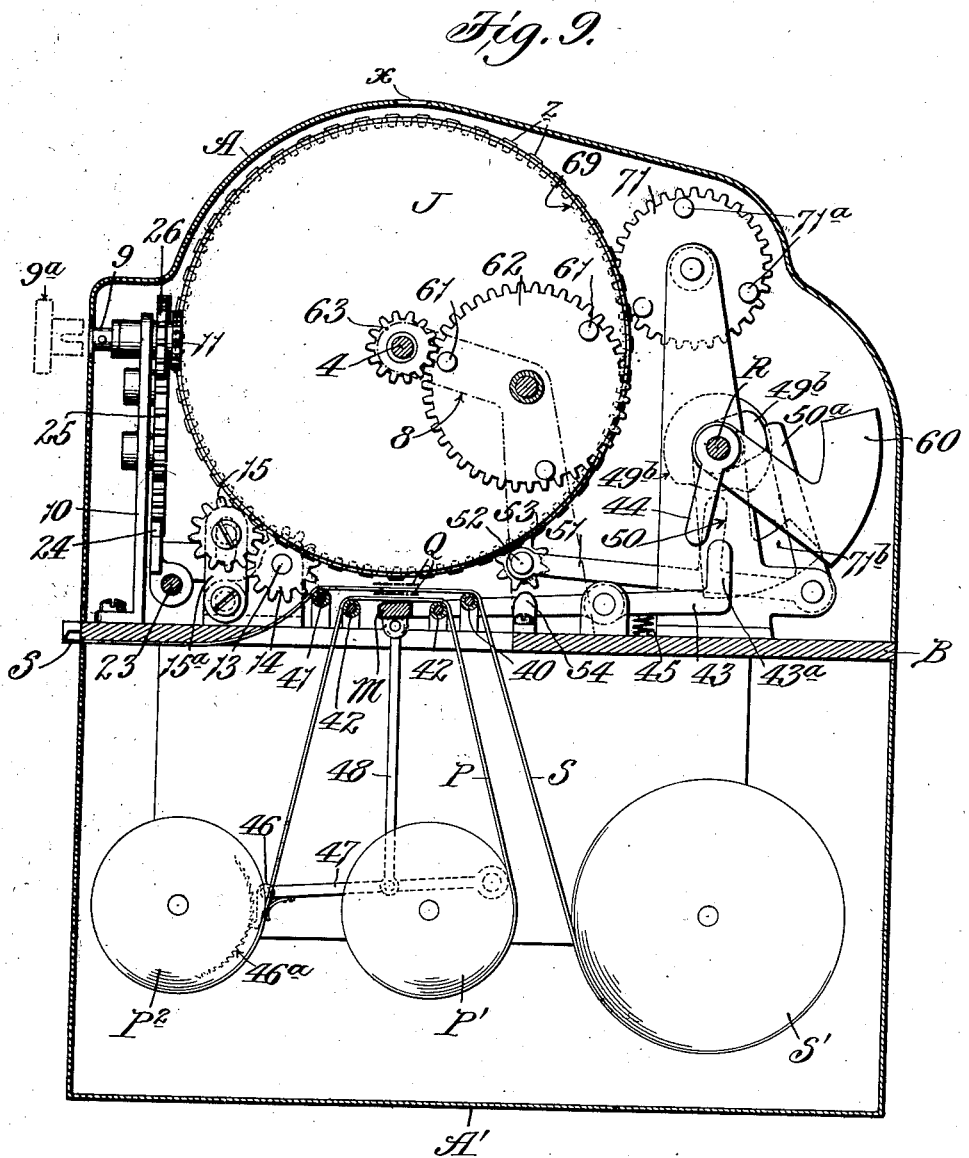
Fig. 9 is a transverse sectional view, taken approximately on the line 9—9 of Fig. 3.

Referring to the drawings which represent the preferred form of my invention, A designates the casing or housing of the machine that incloses the quantity indicator, the price per yard indicator, the cost computing mechanism, the printing mechanism and the apparatus that operates said parts. B designates a base plate on which the elements above referred to are mounted and A' designates an extension of the casing A that is arranged on the underside of the base plate B so as to inclose the record strip and the sales slip strip. A roll C, which is arranged at the right hand end of the casing A, outside of same, as shown in Figs. 1 to 3, is used to actuate or impart movement to the sale price computing mechanism and the quantity indicator, the cloth being preferably wrapped partially around said roll C, as shown in Fig. 2, during the measuring operation. A roll D, which is arranged opposite the roll C, serves to hold the cloth in frictional engagement with the roll C, the roll D being so mounted that it can move away from the roll C so as to permit the cloth to be inserted between said rolls and thereafter toward the roll C, so as to exert sufficient pressure on the cloth to prevent it from slipping on the roll C when the free end of the cloth is drawn forwardly through the machine or to the left, looking at Fig. 2. It is, of course, immaterial how said rolls are mounted, but I prefer to secure the roll C to a horizontally-disposed shaft 1 that is journaled in bearings on the end wall of the housing A and on a bracket A² on said end wall, the roll D being rotatably mounted on an arm 2 that is pivotally connected at 3 to the end wall of the housing A.

The quantity indicator of the machine herein shown is composed of two elements, one of which I will term a fraction wheel E and the other a yards wheel F. The fraction wheel E is rigidly secured to a horizontally disposed shaft 4 that extends longitudinally through the housing A, as shown in Fig. 4, and the yards wheel F is loosely mounted on said shaft and is combined with mechanism hereinafter described which causes said yards wheel to move one step forwardly at each complete revolution of the fraction wheel E. The shaft 4 is geared directly with the measuring roll C by means of a gear 5 on the shaft 4 that meshes with a pinion 6 on the shaft 1, as shown in broken lines in Fig. 5, but it is, of course, immaterial what means is employed for transmitting movement from the measuring roll C to the various parts of the machine controlled by same, so long as said parts will move in unison with or in a certain relation with the feed roll. The fraction wheel E is provided on its periphery with characters that designate fractions of a yard, and the yards wheel F is provided on its periphery with numerals, as shown in Fig. 3, that designate yards. A sight opening x that is formed in the top wall of the casing A of the machine, as shown in Fig. 1, enables the operator in charge of the machine to see at any time only one of the numbers on the yards wheel, and preferably, several of the characters on the fraction wheel.

A price per yard indicator which preferably consists of a wheel G is arranged at one side of the fraction wheel E, as shown in Fig. 3, said wheel G being provided on its periphery with numbers arranged so that only one number can be seen at the same time through the sight opening x in the top wall of the casing. The price per yard indicator G revolves about the shaft 4, but it is not mounted on said shaft. On the contrary, it is mounted on a stationary hub or bearing 7 through which the shaft 4 passes, said bearing being carried by a laterally-projecting arm 8 on a standard that projects upwardly from the base plate B of the machine. The indicator G is adapted to be turned by the operator so as to bring the number on said indicator which designates the price per yard of the cloth being measured into alinement with the sight opening x in the top wall of the housing of the machine. The means herein shown for adjusting the indicator G consists of a horizontally-disposed shaft 9 journaled in a bearing 10 arranged at the rear side of the machine, as shown in Fig. 9, and provided with a pinion 11 that meshes with a gear 12 on the indicator wheel G. The zero character on the indicator G normally stands in alinement with the sight opening x, previously referred to, but by turning the shaft 9 said indicator G can be moved into such a position that the number on the periphery of same that corresponds with the price per yard of the cloth being measured will be brought into alinement with the sight opening x. The shaft 9 is provided with an operating device 9ª that is arranged at the rear side of the casing of the machine, as shown in Fig. 3.

The sale price computing mechanism comprises an accumulator or totalizer composed of a units wheel H, a tens wheel I and a hundreds wheel J provided with numerals which coöperate with each other to represent the sale price of the piece of cloth measured by the machine, and an adjustable means for transmitting movement from the measuring roll C to said accumulator or totalizer. In the machine herein shown the adjustable transmitting means just referred to is composed of a number of toothed segments $a, b, c, d, e, f, g, h, i, j, k, l, m, n$ and $o$ arranged in groups on a drum K that is rigidly connected to the shaft 4, an adjustable pinion L that is adapted to be moved into position to coöperate with the toothed segments of a particular group, depending upon the price per yard of the cloth being measured, and a shaft 13 splined to the adjustable pinion L and provided with a gear 14 that meshes with an idler 15 which in turn meshes with a large gear 16 that is arranged at the right hand side of the units wheel H, the gear 16 being normally in mesh with a pinon 17 that meshes with a gear 18, shown in Fig. 10, which is rigidly connected to the units wheel. As shown in Fig. 9, the idler 15 is adjustably mounted on a bracket 15ª, so that driving pinions 14 of different sizes may be utilized to change the ratio between the drum K and the accumulator wheels whenever it is desired to change the sale price per yard scale. The machine can be so designed that it computes the sale price of any desired fraction of a yard, and by increasing the number of toothed segments on the drum K, the range of prices can be made great enough to adapt the machine to cloth selling from a few cents per yard to several dollars per yard. However, as the accompanying drawings are intended to illustrate merely the principle of my invention, I have shown the machine as being designed to compute the sale price of quarter yards and having a price range of fifteen different prices, varying from 19 cts. per yard to 61 cts. per yard. When constructed in the manner just referred to each group of toothed segments will comprise four segments spaced an equal distance from each other around the periphery of the drum K, the segments $a$ of the first group being used when cloth selling at 19 cts. per yard is being measured, the segments $b$ of the second group being used when cloth selling at 22 cts. per yard is being measured, etc. When cloth of the highest price which the machine is capable of handling is being measured, the units wheel of the accumulator will start to rotate practically as soon as the measuring roll C commences to turn during the operation of drawing the cloth through the machine, thus causing a relatively high number to be set up in the accumulator. This, of course, is due to the fact that the segments $o$ which are then in use extend around nearly the entire periphery of the drum K and are separated from each other by relatively short gaps. When cloth of the lowest price is being measured, the units wheel of the accumulator will not start to turn until after the measuring roll C has moved some distance and will stop sometime before the roll C has measured off the first quarter of a yard, thus causing a relatively lower number to be set up in the accumulator. This, of course, is due to the fact that each of the segments $a$ are separated from each other by relatively long gaps and each of said segments comprises only a few teeth. When the machine is designed to compute the sale price of cloth selling at odd prices, for example, 61 cts. per yard, the first segment of group $o$ will be provided with sixteen teeth and each of the remaining segments of said group with fifteen teeth, so that the odd cent will be computed in the price of the first quarter yard. The drum K can either consist of a die casting having the toothed segments cast integral therewith, or it can consist of a cylindrical-shaped member having toothed or mutilated rings 19 mounted on the periphery of same and spaced apart by spacing rings, as shown in Fig. 4, that are provided with elongated grooves 20, for a purpose hereinafter described. The sliding pinion L that coöperates with the segments on the drum K is moved back and forth, longitudinally of the shaft 13, by mechanism that is operatively connected with the manually-operable adjusting shaft 9 which is used to position the price per yard indicator G. As shown in Fig. 7, the pinion L is arranged between a pair of arms 21 on a carriage 22 that is slidingly mounted on horizontally-disposed rods 23. Said carriage 22 is provided with a rack bar 24, and a train of gears 25 is arranged between said rack bar and a pinion 26 on the shaft 9, the gears 25 being mounted on the plate or standard 10 in which the shaft 9 is journaled. When the shaft 9 is turned to move the indicator G into such a position that the number on said indicator which represents the price per yard of the cloth to be measured will be exposed to view through the sight opening $x$, the carriage 22 will move longitudinally of the rods 23 into such a position that the sliding pinion L will aline with the group of toothed segments on the drum K that corresponds with the number on the indicator G that is exposed to view through the sight opening. Consequently, the act of setting the price per yard indicator in proper position causes the condition of the price computing mechanism to be changed automatically so that it will compute properly the price of the piece of cloth measured by the machine. In order that the shaft 13 which transmits movement to the accumulator will remain at rest after the pinion L has passed out of engagement with the toothed segment of one group and before it engages the next segment of said group during the operation of measuring the cloth, I have provided the machine with means for locking the shaft 13 when the pinion L is positioned in the gap between said adjacent segments. The means that I prefer to use for this purpose consists of a pinion L' of slightly larger diameter than the pinion L and rigidly connected to said pinion L, the pinion L' being arranged at one side of the pinon L in such a manner that when the pinion L is positioned in the gap between two adjacent segments of one group, two teeth of the pinion L' will bear upon the periphery of one of the spacing rings on the periphery of the drum K, as shown in Fig. 5, thereby preventing the pinions L, L' and the shaft 13 from turning. The spacing rings are provided with elongated grooves 20, previously referred to, which are so proportioned that a groove 20 is provided for each of the toothed segments on the drum K, the groove 20 that coöperates with a particular segment being of the same length as the segment and arranged at one side of same. When the drum K turns forwardly far enough to carry one of the segments into engagement with the teeth of the pinion L, the teeth of the pinion L' will enter the groove 20 that coöperates with said particular segment, thus releasing the shaft 13, and consequently, causing the accumulator to start operating. Any suitable means can be used for insuring proper alinement of the pinion L and the particular group of segments on the drum with which it is necessary that said pinion coöperate to properly compute the price of the cloth, but one means that I have found to be very efficient for this purpose consists of a spring-actuated detent 27 on the supporting plate 10 that coöperates with one of the gears 25, as shown in Fig. 4, and thus prevents the carriage 22 from being moved into such a position that the pinion L is positioned between two adjacent groups of segments on the drum K.

I previously stated that the yards wheel F of the quantity indicator moves one step forwardly at each complete revolution of the fraction wheel E of said indicator. Various means can be used for causing the yards wheel to operate in this manner, but the means that I prefer to use for this purpose consists of a disk 28 rigidly connected to the shaft 4 and arranged at one side of the yards wheel F, a gear 29 frictionally connected to said yards wheel by means of a spring washer 29ᶜ arranged between said elements, as shown in Fig. 4, and a pinion 30 in mesh with the gear 29 and combined with a pinion 31 having fewer teeth so spaced that two of said teeth are adapted to be engaged by or ride on the periphery of the disk 28. The disk 28 is provided with a pair of teeth 32 which are so arranged that after the disk has made one complete revolution the teeth 32 will engage the teeth of the pinion 30 and cause the same to rotate one step forwardly. Normally, the peripheral edge of the disk 28 turns freely between two of the teeth on the pinion 31, thereby holding said pinion and the pinion 30 stationary. When the disk 28 has made a complete revolution the teeth 32 will engage the teeth of the pinion 30, and any further movement of said disk will cause the teeth 32 to impart a partial revolution to the pinion 30, so as to move the gear 29 and its quantity indicating wheel one step forward. The pinion 30 being conjoined to the pinion 31 is normally held from rotation by reason of the fact that two of the teeth of the pinion 31 normally ride on the periphery of the disk 28. However, whenever the teeth 32 come in contact with the teeth of the pinion 30, said pinion is caused to partially rotate, owing to the fact that the disk 28 is cut out or provided with a recess 32ᵃ between the teeth 32 which permits one of the teeth of the pinion 31 to enter the edge of said disk, as shown clearly in Fig. 11. The measuring roll C and the fraction wheel E are so proportioned that said fraction wheel will make one complete revolution when one yard of cloth is pulled through the machine. Consequently, each time a yard of cloth is pulled through the rolls C and D the yards wheel will move forwardly one step, and thus bring into alinement with the sight opening $x$ the number on the periphery of the yards wheel that designates the quantity of the cloth measured. Assuming that the zero character on the yards wheel F is in alinement with the sight opening $x$ when the operator starts measuring the cloth, said yards wheel will move forwardly one step, and thus bring the number 1 thereon into alinement with the sight opening when one yard of cloth has been drawn between the rolls C and D. Each subsequent yard that is drawn through the machine will cause the yards wheel to move one step forward, thus causing the quantity indicator to show 2 yards, if two yards is drawn through the machine, 3 yards if three yards is drawn through the machine, etc. The fractions of a yard are represented by the numbers on the periphery of the fraction wheel E, the sight opening $x$ being preferably provided with laterally-projecting extensions $x'$ at a point in alinement with the fraction wheel so that the operator can see a relatively large portion of the periphery of the fraction wheel, and thus can tell when the fraction wheel is approaching the point where the feed roll C must be stopped to measure the desired quantity of cloth.

The means previously referred to for producing a permanent record of each sale and for producing a sale slip or check which the operator hands to the customer preferably consists of raised numbers or printing numbers on the wheels of the accumulator, on the price per yards wheel, on the fraction wheel and on the yards wheel, means for arranging a record strip and a sales slip strip in a certain position with relation to said wheels, and inking ribbons or an equivalent means for causing said raised numbers to make a permanent impression on said record strip and sales slip strip. As shown in Fig. 3, the yards wheel F, the fraction wheel E and each of the wheels of the accumulator are provided with a portion $y$ that is equipped with raised numbers $z$ which are arranged directly opposite the numbers on the peripheries of said wheels which designate the number of yards and fractions of cloth measured and the price of said cloth, the raised numbers $z$ being so positioned that they will coöperate properly with a platen M arranged on the underside of said wheels, as shown in Fig. 9. The price per yards wheel G is not provided with a portion similar to the portion $y$ just described, but instead, the raised numbers on the wheel G are formed on the lower half of the peripheral edge of said wheel. A sales slip strip S and a permanent record strip P are arranged above the platen M and two carbon ribbons Q or other suitable inking devices are combined with said strips in such a manner that when the platen M is moved upwardly a record of the sale or transaction consisting of the quantity of the cloth measured, the price per yard of the cloth, and the price of the piece of cloth measured will be printed on the sales slip strip S and on the record strip P. The strip S leads upwardly from a supply roll S', over a guide roll 40, thence forwardly across the platen to a guide roll 41. The record strip P leads upwardly from a supply roll P' over guide rolls 42, and thence downwardly to a rewinding roll P², as shown in Fig. 9, said supply rolls and rewinding roll being arranged in the portion A' of the housing of the machine that is positioned under the base plate B. The platen M is carried by a pair of rock arms 43, one of which is provided with an upwardly-projecting portion 43ª that is adapted to be engaged by a tripping arm 44 on the manually-operable clearing shaft R during the first part of the operation of clearing the machine, as hereinafter described, the platen being normally held in its depressed position by means of an expansion spring 45, shown in Fig. 9. Forward movement is imparted to the rewinding roll P² so as to feed the record strip forwardly by any suitable means, the means herein shown consisting of a pawl 46 carried by a pivotally mounted lever 47 that is connected by means of a link 48 with the platen, said pawl 46 coöperating with a ratchet wheel 46ª on the rewinding roll. After the printing operation the operator in charge of the machine pulls the strip S forwardly and tears off the portion of same on which the transaction is printed, thus producing a sale slip that is handed to the customer.

The clearing mechanism or restoring mechanism of the machine comprises the shaft R previously referred to and means operated by said shaft for moving the yards wheel and fraction wheel and the wheels of the accumulator back to zero position, for moving a cutting device that forms a slit in the edge of the cloth and for moving certain other parts that insure proper alinement or coöperation of the various parts. In addition to the tripping arm 44 previously referred to that effects the upward movement of the platen M, the clearing shaft R is provided with a double cam 49 which coöperates with two arms 50 and 50ª on a rockable carrier 51 which supports the shaft 52 on which the carrying or transfer pinions 53 and the pinion 17 of the accumulator are mounted, as shown in Figs. 9 and 10. As clearly shown in Fig. 10, the carrying or transfer means of the computing mechanism is similar to that previously described in connection with the yards wheel F and comprises a disk 28ª on the units wheel H, and a disk 28ᵇ on the tens wheel I, a gear 29ª on the tens wheel I and a gear 29ᵇ on the hundreds wheel J, and the double pinions 53 similar to the pinions 30—31, previously described, which coöperate with said disks and gears. In view of the fact that the units and tens wheel each contain a plurality of complete sets of digits, there will be a corresponding number of teeth 32 in the periphery of the disks 28ª and 28ᵇ, so that whenever the units or tens wheel moves a distance equal to one set of digits, the wheel of next higher order will be moved forwardly one space. In order to more clearly illustrate the carrying or transfer mechanism, the pinions are shown in Fig. 10 as being disengaged from the gears and disks with which they coöperate. When the shaft R is turned to clear the machine, the raised portion 49ª of the cam 49 engages the arm 50 and moves the carrier 51 downwardly, thereby disengaging the pinions 53 on the shaft 52 from the gears with which they coöperate, and thus permitting the clearing devices hereinafter described to restore the wheels of the accumulator to zero. After said wheels have been restored to zero the raised portion 49ᵇ of the cam 49 engages the arm 50ª and moves the carrier 51 upwardly, thus causing the pinions 53 on the shaft 52 to reëngage the gears with which they coöperate. In order to prevent the pinions on the shaft 52 from turning into an improper position when they are disengaged from their coöperating gears, I have provided the machine with a locking device or bar 54, shown in Fig. 9, which is so arranged that it will engage and hold each of said pinions when the carrier 51 rocks downwardly. The hundreds wheel J of the accumulator is restored to zero position by means of a sweep 60 on the shaft R that coöperates with laterally-projecting pins 61 on a gear 62 which meshes with a pinion 63 that is secured to the hundreds wheel J, as shown in Fig. 9, the gear 62 having three times as many teeth as the pinion 63, so that one third of a revolution of the gear 62 will produce a complete revolution of the hundreds wheel J. The movement of the hundreds wheel forwardly from its zero position causes the gear 62 to assume such a position that one or the other of the pins 61 on said gear will be engaged by the sweep 60 when the shaft R is turned to clear the machine. When the end of said sweep engages the pin 61 which is then in the path of movement of the sweep, the gear 62 and the hundreds wheel J will start to revolve rearwardly, and by the time the gear 62 reaches such a position that the sweep passes out of engagement with the pin 61 with which it contacted, the hundreds wheel will stand at zero. A similar sweep 60ª, gear 62ª and pinion 63ª are provided for restoring the drum K, the disk 28 and the fraction wheel E to starting position, the gear 63ª being rigidly connected to the shaft 4, as shown in Fig. 4. The yards wheel F is also restored to zero position by a similar mechanism comprising a sweep 60ᵇ, gear 62ᵇ and pinion 63ᵇ, which is rigidly connected to the yards wheel F. The restoring mechanism for the units and tens wheels of the accumulator is of similar design, but is of slightly different construction, owing to the fact that the units and tens wheels each have several groups of numbers, and consequently, have several zero positions. As shown in Figs. 3 and 9, the gear 18 on the units wheel, and the gear 29ª on the tens wheel mesh with pinions 70 and 71, respectively, that are provided with laterally-projecting pins 70ª and 71ª which coöperate with sweeps 70ᵇ and 71ᵇ, respectively, on the restoring shaft.

As previously stated, means is provided for cutting or nicking the edge of the cloth after the operator has measured off the desired quantity, the means herein shown comprising a knife or cutting element having a cutting edge 72 that is normally out of the path of movement of the cloth being measured. Said cutting element is pivotally mounted on the end wall of the machine adjacent the roll C, and the cutting edge 72 projects through a slot 73 in said end wall and is adapted to coöperate with a slot 74 formed in a shelf or flange 75 on the bracket A² that partially surrounds the roll C. After the cloth has been measured, movement is imparted to said knife by means of a cam or projection 76 on the clearing shaft R that coöperates with an extension 72ª on said element, so as to cause said cutting edge 72 to descend into and through the slot 74 and thus shear or nick the edge of the cloth $v$. A spring 77 (see Fig. 6) restores the knife to normal position after the cam 76 has passed from under the extension 72ª.

In order to prevent any manipulation of the parts of the machine by a thoughtless person at times other than when measuring cloth, I provide means for locking the drum and its associate parts against rotation and also for locking the clearing shaft R against rotation at the completion of its stroke. Various devices may be employed to accomplish this end, but in the embodiment of my invention herein shown said means consists of a pawl 78 that coöperates with a notch 79 in the periphery of the drum K, and a pawl 80 that coöperates with a notch 81 in a disk 82 on the shaft R. The pawl 78 is caused to move into engagement with its coöperating notch 79 by means of a cam block 83 that coöperates with the upper inclined end 83ª of said pawl. The block 83 is carried by a lever 84 that is pivotally mounted intermediate its ends to the end wall of the machine, said lever having a projection 85 that lies in the path of movement of a cam 86 on the shaft R. An extension or finger piece 87 on the outer end of said lever projects through the casing of the machine, for a reason hereinafter appearing, and the inner end of said lever is pivotally connected to a link 88 which is in turn pivotally connected to the upper end of the arm or bracket 2 that carries the roll D. By referring to Fig. 5, it will be seen that the lever 84 and link 88 form a toggle which is utilized to move the roll D toward or away from the roll C. In order that the arm 2 carrying the roll D can yield slightly so as to accommodate cloth of different thicknesses or characteristics, I provide a spring 89 which exerts a pull on the link 88 in a direction to bring the rolls D and C together whenever the toggle is broken.

The pawl 80 is provided with a tail piece that coöperates with a pin 90 on the lever 84. In the position of the parts shown in Fig. 5, the clearing shaft R has completed its revolution, the cam 86 has tripped the projection 85 to straighten out or throw slightly beyond centers the toggle levers 84 and 88 and the machine is locked. When it is desired to use the machine, the operator first places the cloth around the roll C, the rolls D and C being now spaced apart, and then presses downwardly on the finger piece 87. This movement breaks the toggle joint and causes the roll D to clamp the cloth tightly against the roll C, the block 83 leaves the end 82ª of the pawl 78 and allows a spring 91 to withdraw said pawl from engagement with the notch in the drum K, the pin 90 depresses the tail piece of the pawl 80 and thus withdraws the nose thereof from the notch 81.

In order to insure the printing type being lined up properly for printing, I preferably provide means for centering or truing up the printing wheel carried by the drum K just prior to the printing operation. This means consists of the pawl 78 and notch 79 just described and three additional notches 79ª spaced equal distances apart around the periphery of the drum K, (see Figs. 3 and 5). A cam 92 on the shaft R is so positioned that at the very first movement of the shaft to clear the machine said cam will engage a projection 93 on the pawl 78 and momentarily force said pawl inwardly. As the machine herein shown is designed to measure quarter yards, one of the notches 79 or 79ª will be approximately opposite the nose of the pawl 78 whenever the operation of measuring the cloth is completed. As said nose and notches are V-shaped (see Fig. 5), the entering nose will move the drum slightly one way or the other to line up the printing characters properly on the wheels controlled by the drum.

In order to prevent the clearing shaft R from being rotated in the wrong direction, I provide a flat spring 94 that coöperates with a notch 95 in the disk 82, as shown in Fig. 5.

In operation, the cloth $v$ to be measured is passed around the roll C in the manner indicated in Fig. 2, the end of the cloth being passed between the roll C and a curved guide 97, so that it extends laterally over the flange or shelf 75 and under the knife 72. The finger piece 87 is then depressed, which allows the roll D to move toward the roll C and hold the cloth $v$ in frictional contact with said roll, and also releases the pawls 78 and 80 from engagement with their respective notches so that the machine is unlocked. The operator then pulls outwardly on the cloth $v$ until the desired quantity is indicated on the yards wheel F and fraction wheel E, it being understood that prior to measuring the cloth the shaft 9 has been moved to bring the desired price per yard numeral to view through the sight opening $x$. In the record visible through the sight opening in Fig. 1, the price per yard is shown as being 61 cts. The amount of cloth measured, as indicated on the wheels F and E, is 2¼ yds. and the sale price, as indicated on the accumulator wheels, is shown as $1.38. After the operator has measured the desired 2¼ yds. of cloth in the manner previously described, he operates the clearing shaft R in order to print a record of the sale, nick or cut the cloth, clear or restore the parts of the machine to zero position, and then to lock the moving parts against movement.

In the embodiment of my invention herein shown the shaft R is provided with a handle 96 that projects through the casing or housing of the machine, said handle being adapted to be given one complete rotation by the operator in order to clear the machine. The sweeps, cams, etc., previously described, are so arranged on the shaft R that the order of their operation is as follows:

1st. The cam 92 engages the projection 93 on the pawl 78 and forces said pawl inwardly into engagement with the notch 79 in the drum K, thus centering or alining the printing characters properly. At this same period the cam 76 actuates the knife 72 to nick the edge of the cloth.

2nd. The cam 44 actuates the platen M to print a record of the transaction.

3rd. The cam 92 having passed out of engagement with the pawl 78, leaves the drum K free to be rotated, which rotation is now effected by the sweep 60ª which restores the drum and its carried parts, the transfer wheel 28 and the fraction wheel E, to zero position.

4th. The cam 86 moves the outer end of the lever 84 upwardy to straighten out the toggle and separate the rolls C and D so that the cloth may be easily removed from the machine, movement of the lever 84 by said cam simultaneously forcing the nose of the pawl 78, by means of the cam block 83, into engagement with its coöperating notch 79 so as to again lock the drum against rotation.

5th. The accumulator or computing wheels H, I and J are next restored to their zero positions by means of their respective sweeps and slight further movement of the shaft will bring the notch 81 into alinement with the nose of the pawl 80, so that said pawl will drop into said notch by gravity and lock the shaft R against rotation in either direction until the finger piece 87 is again actuated, at the next operation of the machine. When the complete revolution or stroke of the clearing shaft is completed, the flat spring 94 falls into the notch 95 and thus prevents movement of the shaft R in the wrong direction, when the machine is next cleared.

From the foregoing it is obvious that I have devised a machine that is extremely efficient for the purpose described, namely, for accurately measuring the cloth, for computing the sale price of the cloth measured, for making simultaneously a sale slip check and a permanent record which identifies the particular transaction, and which can be used advantageously in taking stock. The machine is comparatively small and compact so that it does not take up much room on the counter, it can be easily operated by an unskilled person and presents a neat and ornamental appearance.

Having thus described my invention, what I claim, and desire to secure by Letters Patent, is:

1. A cloth measuring machine provided with a housing having a sight opening, a roll that turns during the operation of passing cloth through the machine, a quantity indicator operating in conjunction with said roll and provided with characters that move progressively into alinement with the sight opening in said housing, said indicator being hidden from view by said housing, and a price computing mechanism operating in conjunction with said roll and comprising accumulator wheels equipped with characters or symbols arranged so that only those characters which represent the sale price of the piece of cloth measured will be exposed to view at the termination of the measuring operation.

2. A cloth measuring machine provided with a means operated or moved by the cloth being measured, a housing provided with a sight opening through which the operator looks to ascertain the quantity of cloth measured and the price of the measured piece of cloth, an automatically operating quantity indicator provided with symbols that represent units of measurement and so arranged that said symbols will move progressively into alinement with said sight opening when cloth is being measured, a price computing mechanism operated by said cloth operated means and comprising members provided with symbols representing dollars and cents that move progressively into alinement with said sight opening, and means for hiding from view all of the symbols except those that represent the quantity and sale price of the piece of cloth measured.

3. A cloth measuring machine, comprising a housing provided with a sight opening through which the operator looks to ascertain the quantity and sale price of the piece of cloth measured in the machine, a manually adjustable price indicator constructed so that it will expose to view only the price of the particular cloth being measured, a cloth measuring means comprising an automatically operating quantity indicator constructed so that it will expose to view symbols which represent the length of the piece of cloth measured, and a price computing mechanism operating in conjunction with said quantity-indicator and constructed so that it will expose to view only the sale price of said piece of cloth.

4. A cloth measuring machine, comprising a quantity indicator and a price computing mechanism provided with symbols or characters representing units of measurement and dollars and cents, respectively, and constructed in such a manner that at the termination of the operation of measuring a piece of cloth only the symbols or characters on said indicator and computing mechanism which represent the quantity of the cloth measured and the sale price of same can be seen by the operator in charge of the machine, and a means moved or actuated by the cloth passed through the machine for causing said quantity indicator and price computing mechanism to operate.

5. A cloth measuring machine, comprising a quantity indicator, a price per yard indicator and a total price computing mechanism provided with symbols or characters, most of which are hidden from view, said indicators and mechanism being so constructed that at the termination of the operation of passing cloth through the machine said indicators and computing mechanism will display to view only the particular symbols or characters which represent the length of the piece of cloth measured, the price per yard of said cloth and the sale price of the measured piece, and a movable cloth engaging device that operates in conjunction with said quantity indicator and computing mechanism.

6. A cloth measuring machine provided with a casing or housing in which two sight openings are arranged adjacent each other, a quantity indicator comprising movable elements provided with characters, a sale price indicator comprising movable elements provided with characters, most of the characters on said elements being hidden from view by the casing, and means whereby the operation of passing cloth through the machine causes said indicators to operate and expose to view through said sight openings two numbers, one of which represents the sale price of the piece of cloth measured and the other the length of said piece of cloth.

7. A cloth measuring machine provided with a cloth-measuring means, an accumulator equipped with characters that represent the sale price of the piece of cloth measured in the machine, and a driving mechanism for said accumulator operated by said cloth-measuring means and comprising a means that is adapted to be adjusted so as to vary the operation of said accumulator with reference to said cloth-measuring means, thereby enabling the machine to be used for computing the cost of cloth sold at various prices per yard.

8. A cloth measuring machine provided with a roll that turns when cloth is being passed through the machine, an accumulator for indicating the sale price of the piece of cloth measured and comprising units, tens and hundreds wheels, and a mechanism arranged between said roll and accumulator for operating the accumulator and comprising one shiftable element, which upon being moved into a different position, changes the relation between said accumulator and roll.

9. A cloth measuring machine provided with a roll that turns when cloth is being passed through the machine, an accumulator for indicating the sale price of the piece of cloth measured in the machine, and mechanism operated by said roll for actuating said accumulator, said mechanism comprising a part provided with a plurality of gears or toothed segments having different numbers of teeth and a pinion that is adapted to be adjusted so as to coöperate with one or the other of said gears or segments according to the price per yard of the cloth being measured.

10. A cloth measuring machine provided with a cloth-measuring means, an accumulator for indicating the sale price of the piece of cloth measured in the machine, an operating mechanism for said accumulator actuated by said cloth-measuring means and comprising an element provided with a plurality of different parts, each of which is capable of changing the operation of said accumulator relatively to said cloth-measuring means, and an adjustable device that is adapted to coöperate with one or the other of the parts on said element according to the price per yard of the cloth being measured.

11. A cloth measuring machine, comprising a cloth-measuring means, an indicator for showing the sale price of the piece of cloth measured in the machine, and means whereby the act of passing a yard of cloth through the machine will cause said indicator to operate intermittently, more or less, during the passage of fractional yards, depending on the price per yard of the cloth being measured.

12. A cloth measuring machine provided with a cloth-measuring means, an indicator for showing the sale price of the piece of cloth measured, and means whereby the act of passing a fraction of a yard of cloth through the machine will cause said indicator to move and then cease operating, and thereafter start operating when the succeeding similar fraction of the yard is passed through the machine.

13. A cloth measuring machine, comprising a cloth-measuring means, an indicator for showing the price of the piece of cloth measured in the machine, and an adjustable operating mechanism for said indicator constructed in such a manner that the condition of the indicator will be changed intermittently each time a fraction of a yard of cloth is passed through the machine.

14. A cloth measuring machine, comprising a cloth-measuring means, an accumulator for indicating the price of the piece of cloth measured in the machine, an operating mechanism for said accumulator comprising a plurality of groups of toothed segments arranged so that they will revolve, the segments of each group having a different number of teeth, and an adjustable pinion that is adapted to be engaged with one or the other of said groups according to the price per yard of the cloth being measured.

15. A cloth-measuring machine provided with a cloth-measuring means, a price per yard indicator consisting of a circumferentially adjustable wheel provided with a plurality of numerals, each of which represents the price of one yard of cloth, an indicator for showing the sale price of the piece of cloth measured in the machine, an operating mechanism for said sale price indicator actuated by said cloth-measuring means, and means for adjusting the price per yard indicator and simultaneously changing the condition of the operating mechanism for the sale price indicator relatively to the cloth-measuring means.

16. A cloth measuring machine, comprising a cloth-measuring means, an indicator provided with symbols or characters that represent different prices per yard of cloth, a separate indicator for showing the sale price of the piece of cloth measured in the machine, an operating mechanism for said sale price indicator actuated by said cloth-measuring means and comprising a plurality of parts which bear a certain relation to the characters on said price per yard indicator, an adjustable device that is adapted to coöperate with one or the other of said parts, and means for adjusting said price per yard indicator and also establishing coöperation between said adjustable device and one or the other of the parts of said operating mechanism.

17. A cloth measuring machine, comprising a cloth-measuring means, an indicator for showing the sale price of the piece of cloth measured in the machine, an operating mechanism for said indicator actuated by said cloth-measuring means and comprising a drum provided on its periphery with toothed segments arranged in groups, each of which comprises a plurality of segments, and an adjustable pinion that is adapted to coöperate with one or the other of said groups, depending on the price per yard of the cloth being measured.

18. A cloth measuring machine, comprising a cloth-measuring means, an indicator for showing the sale price of the piece of cloth measured in the machine, an operating mechanism for said indicator comprising a drum actuated by said cloth-measuring means and provided on its periphery with a plurality of groups of toothed members, each of which is made up of a number of segments spaced apart from each other, and an adjustable pinion that is adapted to coöperate with the segments of one or the other of said groups.

19. In a calculating machine, a cloth-measuring means, an accumulator, an operating mechanism for same actuated by said cloth-measuring means and comprising groups of toothed segments having different numbers of teeth, and a device that is capable of being arranged in position to coöperate with either of said groups of segments to transmit movement to said accumulator.

20. In a calculating machine, a cloth-measuring means, an accumulator or totalizer, an operating mechanism for same actuated by said cloth-measuring means and comprising a plurality of gears provided with blank spaces, an adjustable pinion that is adapted to be arranged in position to coöperate with any one of said gears, and means for locking said pinion when it is positioned in the blank spaces of the gear with which it coöperates.

21. In a calculating machine, a cloth-measuring means, an accumulator or totalizer, an operating mechanism for same comprising a rotatable drum actuated by said cloth-measuring means and provided on its periphery with gears having blank spaces, an adjustable pinion that is adapted to coöperate with said gears, and a part on said pinion that coöperates with slots or grooves in said drum to permit said pinion to rotate when in mesh with any one of said gears, but which locks the pinion when it is positioned in the blank spaces of the gear with which is coöperates.

22. In a calculating machine, a cloth-measuring means, an accumulator or totalizer, an operating mechanism for same comprising a drum actuated by said cloth-measuring means and provided on its periphery with gears having blank spaces, a pinion that is adapted to be arranged in position to coöperate with any one of said gears, and means for positively alining said pinion with the gear with which it coöperates.

23. A cloth measuring machine provided with a cloth measuring means, comprising a quantity indicator equipped with means for showing the length of the piece of cloth measured, an indicator operating in conjunction with said quantity indicator and provided with means for showing the sale price of said piece of cloth, means for causing said indicators to operate in unison when a piece of cloth is passed through said cloth measuring means, means that coöperates with said indicators for producing a sale slip for the customer that has marked thereon the length of the piece of cloth measured and the sale price of same, and means adjustable in accordance with the price per yard of the cloth for changing the mechanical relationship between said indicators.

24. A cloth measuring machine provided with a cloth measuring means, comprising a quantity indicator equipped with means for showing the length of the piece of cloth measured, an indicator operating in conjunction with said quantity indicator and provided with means for showing the sale price of said piece of cloth, means for causing said indicators to operate in unison with said cloth measuring means when said cloth measuring means is actuated, an adjustable price per yard indicator combined with the sale price indicator in such a manner that a change in the position of the price per yard indicator effects a change in the condition of the sale price indicator, and means that coöperates with said indicators for producing a sale slip for the customer that has marked thereon the length of the piece of cloth measured and the sale price of same and also the price per yard of said cloth.

25. A cloth measuring machine provided with a cloth measuring means, comprising a quantity indicator, an adjustable price per yard indicator, a sale price computing mechanism, means for causing said quantity indicator and said computing mechanism to act in unison when said cloth measuring means operates, means for effecting a change in the condition of said sale price computing mechanism when said price per yard indicator is adjusted, and means that coöperates with both of said indicators and with said computing mechanism for printing on a record characters which show the quantity of cloth measured, the price per yard of same and the sale price of the piece of cloth that is delivered to the customer.

26. A cloth measuring machine provided with a cloth measuring means, means for marking on a permanent record and on a duplicate record characters that indicate the length of the piece of cloth measured, the price per yard of the cloth and the sale price of the piece, mechanism governed by said cloth measuring means for positioning the printing characters that indicate the length and the sale price of the piece of cloth measured, and means whereby the condition of said mechanism can be changed in accordance with the price per yard of the cloth measured in the machine.

27. A cloth measuring machine provided with a cloth measuring means, a quantity indicator, an adjustable price per yard indicator, a sale price computing mechanism which shows the sale price of the piece of cloth measured, means whereby the operation of adjusting the price per yard indicator effects a change in the condition of the sale price computing mechanism, means for causing said quantity indicator and said computing mechanism to operate in unison whenever a piece of cloth is passed through the cloth measuring means, a record strip and a sale slip strip, and means for printing characters on said strips which show the length of the piece of cloth measured, the price per yard of the cloth and the sale price of the piece.

28. A cloth measuring machine provided with a cloth measuring means, comprising a quantity indicator, a sale price indicator provided with printing characters or raised numbers, an actuating mechanism for said indicators that is operated by the passage of a piece of cloth through the cloth-measuring means, a platen for supporting a strip of material on which a record of the transaction is printed by the characters or numbers on said indicators, and means whereby the mechanical relationship between said indicators can be varied in accordance with the price per yard of the cloth measured in the machine.

29. A cloth measuring machine provided with a cloth measuring means, comprising a quantity indicator provided with characters that represent yards and fractions of yards, a separate indicator provided with characters that represent different prices per yard of cloth, an accumulator provided with characters that represent dollars and cents, means for adjusting said price per yard indicator and also effecting a change in the condition of said accumulator, said indicators and accumulator having printing characters or numbers thereon, and means whereby the completion of each transaction of said printing characters or numbers will be recorded on a record strip and on a sale slip strip.

30. A cloth measuring machine provided with a cloth measuring means, comprising a quantity indicator provided with symbols or characters that represent yards and fractions of yards, a price per yard indicator, a sale price computing mechanism comprising an indicator which shows the sale price of the piece of cloth measured, means for adjusting said sale price indicator and simultaneously changing the condition of said sale price computing mechanism, and means for producing a permanent record and a sale slip at the termination of each transaction for which the machine is used, which record and sale slip show the quantity of cloth measured, the price per yard of the cloth and the sale price of the piece of cloth.

31. A cloth measuring machine provided with a cloth measuring means, comprising a quantity indicator, a price per yard indicator and a total price computing mechanism provided with symbols or characters most of which are hidden from view, means whereby the operation of passing cloth through the machine causes said indicators and computing mechanism to display to view only the particular symbols or characters which represent the length of the piece of cloth measured, the price per yard of said cloth and the sale price of the measured piece, and means for restoring the machine to starting position.

32. A cloth measuring machine, comprising means for measuring the length of a piece of cloth, means for computing the sale price of said cloth, means that cooperate with said measuring means and said computing means for making a record of the length and price of said cloth, and means for restoring the machine to starting position.

33. In a cloth measuring machine, a roll about which the cloth to be measured is adapted to be partially wrapped, a flange adjacent said roll and provided with a notch that is covered by one of the side edge portions of the cloth being measured, and a knife adapted to be swung in an arc so as to pass through said notch and shear or cut the edge of the cloth.

34. In a cloth measuring machine, means for measuring the length of a piece of cloth, means for registering said measured length, means for restoring said registering means to starting position, and means actuated by said restoring means for cutting or shearing the edge of the cloth at the end of the measured length.

35. In a cloth measuring machine, means for measuring the length of a piece of cloth, means for computing the price of said piece, means for visibly registering said length and price, means for restoring the machine to starting position, and means governed by said restoring means for locking the machine in starting or cleared position.

36. In a cloth measuring machine, means for measuring the length of a piece of cloth, means for computing the price of said piece, means for visibly registering said length and price, means for restoring the machine to starting position, means governed by said restoring means for locking the machine in starting or cleared position, and manually-operable means for unlocking said machine when it is again desired to operate the machine.

37. A cloth measuring machine, comprising a pair of rolls between which cloth to be measured is passed, one of said rolls having a guide which compels the cloth to partially encircle said roll, and means for forcing said other roll into yielding engagement with the cloth.

38. In a cloth-measuring machine, a pair of rolls between which the cloth to be measured is fed, and a guide that coöperates with one of said rolls to cause the cloth to partially embrace said roll.

39. A cloth-measuring machine, comprising a cloth-measuring means, a computing mechanism operated by said means and comprising wheels of different order arranged side by side, and means for restoring said wheels to zero position, said means comprising gear wheels in mesh with said computing wheels, a plurality of laterally-projecting pins on said gear wheels, and arc-shaped members that coöperate with said pins for restoring said computing wheels to zero position.

40. A cloth-measuring machine, comprising a cloth-measuring means, a computing mechanism operated by said means and comprising a plurality of counting wheels arranged side by side, each of said wheels comprising one or more complete set of digits, means whereby movement of one wheel a distance equal to one set of digits will actuate the adjacent wheel of next higher order, and means combined with each wheel for simultaneously restoring all of said wheels to zero position.

41. A cloth-measuring machine, comprising a cloth-measuring means, a computing mechanism operated by said means and comprising a plurality of counting wheels arranged side by side, carrying mechanism for imparting movement from any one wheel to the wheel of next higher order, means for rendering said carrying mechanism inoperative, and independent means for restoring each of said wheels to zero position.

42. A cloth-measuring machine, comprising a cloth-measuring means, a computing mechanism operated by said means and comprising a set of accumulator wheels arranged side by side, each of which is provided with a plurality of sets of digits, transfer means associated with said wheels, a plurality of laterally-projecting pins arranged on said wheels, there being one pin for each set of digits, and means that coöperates with said pins for restoring said wheels to zero position.

JOHN J. NOONAN.